United States Patent
Schmidt et al.

(10) Patent No.: US 11,776,707 B2
(45) Date of Patent: Oct. 3, 2023

(54) ELECTRICALLY CONDUCTIVE PASTE

(71) Applicant: Carl Freudenberg KG, Weinheim (DE)

(72) Inventors: Stanislaus Schmidt, Mannheim (DE);
Benno Schmied, Ludwigshafen (DE);
Ivan Schmalzel, Schifferstadt (DE);
Marco Sutter, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 17/907,976

(22) PCT Filed: Mar. 4, 2021

(86) PCT No.: PCT/EP2021/055434
§ 371 (c)(1),
(2) Date: Aug. 30, 2022

(87) PCT Pub. No.: WO2021/175976
PCT Pub. Date: Sep. 10, 2021

(65) Prior Publication Data
US 2023/0116174 A1    Apr. 13, 2023

(30) Foreign Application Priority Data

Mar. 6, 2020  (DE) ..................... 10 2020 106 131.5

(51) Int. Cl.
| | |
|---|---|
| *H01B 1/20* | (2006.01) |
| *C08K 13/00* | (2006.01) |
| *C08J 3/215* | (2006.01) |
| *C08K 13/04* | (2006.01) |
| C08K 3/04 | (2006.01) |
| C08K 7/18 | (2006.01) |

(52) U.S. Cl.
CPC .............. *H01B 1/20* (2013.01); *C08J 3/215* (2013.01); *C08K 13/04* (2013.01); *C08J 2375/04* (2013.01); *C08K 3/041* (2017.05); *C08K 7/18* (2013.01); *C08K 2201/001* (2013.01); *C08K 2201/003* (2013.01); *C08K 2201/005* (2013.01); *C08K 2201/011* (2013.01); *C08K 2201/014* (2013.01); *C08K 2201/016* (2013.01)

(58) Field of Classification Search
CPC ... H01B 1/22; H01B 1/24; C09D 5/24; B05D 5/12; C08K 13/00
See application file for complete search history.

(56) References Cited

U.S. PATENT DOCUMENTS

| | | | |
|---|---|---|---|
| 9,761,349 B2 | 9/2017 | Imahashi | |
| 2010/0209690 A1 | 8/2010 | Sang | |
| 2014/0246628 A1 | 9/2014 | Anhalt | |
| 2015/0137048 A1* | 5/2015 | Critzer | .................... C08L 75/04 |
| | | | 252/514 |
| 2016/0130471 A1* | 5/2016 | Burrows | .............. H05K 1/0326 |
| | | | 252/514 |
| 2016/0225925 A1 | 8/2016 | Wolfe | |
| 2016/0372230 A1 | 12/2016 | Imahashi | |
| 2017/0200527 A1* | 7/2017 | Pujari | ................ B23K 35/3613 |
| 2019/0043638 A1 | 2/2019 | Akaike | |

FOREIGN PATENT DOCUMENTS

| | | |
|---|---|---|
| DE | 112016000610 T5 | 10/2017 |
| EP | 3021329 A1 | 5/2016 |
| WO | WO 2012152262 A1 | 11/2012 |
| WO | WO 2014186460 A1 | 11/2014 |
| WO | WO 2018134411 A1 | 7/2018 |

OTHER PUBLICATIONS

English language translation of form PCT/ISA/237 mailed Jun. 2021.*
Jiu et al "Metallic nanowires and their application", IEEE Transactions On Components, Packaging and Manufacturing Technology, vol. 6, No. 12, Dec. 2016.*
Cinacchi et al. "The effect of size ratio on the sphere structure factor in colloidal sphere-plate mixture", J. Chem. Phys. 137, 204909 (2012).*

* cited by examiner

*Primary Examiner* — Mark Kopec
(74) *Attorney, Agent, or Firm* — LEYDIG, VOIT & MAYER LTD.

(57) ABSTRACT

An electrically conductive paste includes: an elastic binder; and a conductive filler. The conductive filler includes: at least one spherical conductive filler, at least one plate-like conductive filler, and at least one rod-like conductive filler. In an embodiment, the spherical filler has a mean particle diameter, measured in accordance with ISO 21501-2:2019-11 of at most 200 μm.

20 Claims, No Drawings

ELECTRICALLY CONDUCTIVE PASTE

CROSS-REFERENCE TO PRIOR APPLICATIONS

This application is a U.S. National Phase application under 35 U.S.C. § 371 of International Application No. PCT/EP2021/055434, filed on Mar. 4, 2021, and claims benefit to German Patent Application No. DE 10 2020 106 131.5, filed on Mar. 6, 2020. The International Application was published in German on Sep. 10, 2021 as WO 2021/175976 under PCT Article 21(2).

FIELD

The present invention relates to an electrically conductive paste, comprising an elastic binder (A) and a conductive filler (B). The invention further relates to a method of producing the conductive paste, and also relates to its use for applying it on elastomeric substrates.

BACKGROUND

Electrically conductive pastes for forming conductive structures are known in this field of engineering and usually comprise a binder filled with metallic, metallized or carbon particles. A drawback with these pastes is that they have little or no stretchability.

From EP 3 021 329 A1, an electrically conductive paste is known, in which a conductive filler is uniformly dispersed in a resin, the resin being a rubber and the conductive filler being a metal powder having a mean particle diameter of 0.5 to 10 µm. This results in a conductive material having an aspect ratio of 10 to 10,000. The mixtures are produced by the vulcanization method. Preferably, the metal powder is present as a flake, ball, dendrite, aggregate (spherical primary particles aggregated to a three-dimensional shape). A drawback of this paste is that high conductivity is only achieved with high filler contents, since the used material combinations of conductive particles require high filler contents to form a sufficient number of conductive paths. For good conductivities, the necessary filler contents are so high that a high stretchability of the composite material of, e. g., 100% is not possible.

US 2019/0043638 A1 describes an electrically conductive paste containing a solvent, a binder resin comprising no unsaturated bonds within the molecules, and silver-coated resin particles as an electrically conductive filler, which is dispersed within the binder resin. The silver-coated resin particles comprise resin core particles comprising silicone rubber particles, and a silver coating layer covering the surface of the resin core particles. The solids content of additives is between 35 to 75 wt %. A drawback with this coating is that it does not have good stretchability. Moreover, the focus is on silicone coatings.

U.S. Pat. No. 9,761,349 B2, Toyobo Co., describes an electrically conductive paste in which a conductive filler is uniformly dispersed in a resin, wherein the resin is a rubber containing a sulfur atom and/or a rubber containing a nitrile group. The conductive filler is a metal powder having a mean particle diameter of 0.5 to 10 µm and a conductive material, with a group selected from marcato group, amino group and nitrile group, on its surface. A drawback with this coating is that a high additive content has to be used (in the present examples in the range of 75 wt %). The maximum stretchability is 80%.

WO 2018/134411 A1, Francisco Alberto S. A. U, describes a stretchable conductive ink suitable for printing electric circuits onto stretchable, thermoformable and flexible substrates and textiles. The ink is water-based and comprises a conductive material, an EVA copolymer, a co-solvent and a dispersing agent. A drawback with this coating is that it has to use a high content of additives. Furthermore, the maximum stretchability is 80%.

SUMMARY

In an embodiment, the present invention provides an electrically conductive paste, comprising: an elastic binder; and a conductive filler, wherein the conductive filler comprises: at least one spherical conductive filler, at least one plate-like conductive filler, and at least one rod-like conductive filler.

DETAILED DESCRIPTION

In an embodiment, the present invention provides a conductive paste having a high conductivity even with low filler contents and thus enabling high stretchability.

In an embodiment, the present invention provides an electrically conductive paste, comprising an elastic binder (A) and a conductive filler (B), wherein the conductive filler (B) comprises the following components: at least one spherical conductive filler (B1), at least one plate-like conductive filler (B2) and at least one rod-like conductive filler (B3).

It has been surprisingly found according to the invention that the special combination of an elastic binder (A) and a conductive filler (B), comprising at least one spherical conductive filler (B1), at least one plate-like conductive filler (B2) and at least one rod-like conductive filler (B3) allows a conductive paste to be provided having high conductivity also with low filler contents and at the same time high stretchability.

Without any limitation to a particular mechanism, it is assumed that this is possible due to the following mechanism: the plate-like filler (B2) can form conductive "insulae" due to its large surface area, enabling good conductivity in all spatial directions. The rod-like filler (B3), due to its elongate structure, enables the creation of conductive bridges between these insulae, thus forming a conductive, three-dimensional network in the binder matrix. This enables the content of conductive filler (B) to be kept low, which enables high stretchability of the paste. The spherical filler (B1) can dock onto the surface of the plate-like filler (B2) and the rod-like filler (B3) and, due to its morphology, close vacancies in the binder. This leads to an increase in the number of contact points of the fillers overall and thus in the number of conducting paths within the network. The spherical filler (B1) can dock on individually or as an agglomerate, and can also occupy the vacancies in the binder. This has the advantage that it offers less resistance against deformation of the material. Due to the high number of contact points, the paste can be deformed after drying without its conductivity being lost. The network of the three different types of filler thus, due to its special structure, is able to adapt to the movement of the binder on any deformation, without losing its conductivity.

A spherical filler (B1) according to the invention comprises particle-shaped objects which are approximately spherical in shape. These are also particles having an irregular spherical shape rather than an ideal spherical shape.

In a preferred embodiment of the invention, the spherical filler (B1) has a mean particle diameter, measured in accordance with ISO 21501-2:2019-11 (light scattering liquid-borne particle counter) of at most 200 µm, preferably 0.02 µm to 200 µm, more preferably of at most 100 µm, for example from 0.02 µm to 100 µm, even more preferably from 0.02 µm to 50 µm and, in particular, from 0.02 µm to 10 µm.

With a mean particle diameter that is too large, a higher filler content is necessary to achieve good conductivity. Moreover, particles that are too large cannot penetrate small vacancies. With a mean particle diameter that is too small, it cannot be properly bound within the polymer matrix.

Preferably, the spherical filler (B1) comprises materials, selected from the group consisting of metals, in particular transition metals, earth and alkali metals and their salts, metallized glass, metallized ceramic, carbon and mixtures thereof. Carbon particles are particularly preferred. Particularly preferably, the spherical filler (B1) comprises the above-mentioned materials and preferably carbon, in particular in a content of more than 90 wt %, in particular more than 95 wt %.

Further preferably, the content of the spherical filler (B1), in relation to the overall weight of the conductive paste, is from 0.1 to 50 wt %, more preferably from 1 to 15 wt %, even more preferably from 1 to 10 wt %, even more preferably from 1 to 8 wt % and, in particular, from 1 to 5 wt %.

A plate-like filler (B2) according to the invention essentially comprises flat, particle-shaped objects. In particular, these are flat fillers having an aspect ratio of at least 1/10 and smaller than $1/10^6$. The plate-like filler (B2) can also be present in a layered arrangement.

In a preferred embodiment of the invention, the plate-like filler (B2) has a mean particle size, measured in accordance with ISO 21501-2:2019-11 (light scattering liquid-borne particle counter) of at most 150 µm, for example from 0.02 to 150 µm, more preferably of at most 100 µm, for example from 2 µm to 100 µm and, in particular, from 5 to 80 µm. At these particle sizes and, in particular, at a particle size (B2) from 5 µm to 80 µm, the stretchability of the coating is particularly good. With a mean particle diameter that is too large, a higher filler content is necessary to achieve good conductivity.

The plate-like filler (B2) preferably comprises materials selected from the group consisting of metals, in particular transition metals, in particular metallized glass, metallized ceramic, carbon, and mixtures thereof. Particularly preferably, the plate-like filler comprises the afore-mentioned materials and, in particular, metallized glass, preferably in a content of more than 75 wt %, in particular more than 95 wt %. Plate-like carbon particles and/or metallized glass are particularly preferred.

For carbon-based plate-like fillers (B2), in particular for plate-like carbon particles, preferred mean particle sizes are at most 2 µm, for example from 2 µm to 0.01 µm and, in particular, at most 0.8 µm, for example from 0.8 µm to 0.02 µm, measured in accordance with ISO 21501-2:2019-11 (light scattering liquid-borne particle counter).

Further preferably, the content of the plate-like filler (B2) in relation to the overall weight of the conductive paste, is from 0.5 to 50 wt %, more preferably from 5 to 40 wt % and, in particular, from 10 to 25 wt %.

A rod-like filler (B3) is a filler consisting of particles having an elongate shape in relation to their diameter. The surface of the rod-like filler can have vacancies, elevations, recesses or can be essentially smooth. Branched, branch-like, curved, ramified rod shapes are also conceivable.

In a preferred embodiment of the invention, the rod-like filler (B3) has a mean aspect ratio of 0.1, for example from 1/10 to $1/10^8$ and, in particular, at least from $1/10^2$ to $1/10^8$. With an aspect ratio that is too large, a high filler content is necessary to achieve good conductivity.

Preferably, the rod-like filler (B3) comprises materials selected from the group comprising metals, in particular transition metals, metallized glass, carbon, in particular single-layer, preferably graphene-like, as well as multi-layer carbon nanotubes and mixtures thereof. Particularly preferably, the rod-like filler comprises the afore-mentioned materials and, in particular, carbon nanotubes, preferably in a content of more than 90 wt %, in particular of more than 95 wt %.

The content of the rod-like filler (B3) in relation to the overall weight of the conductive paste, is preferably from 0.01 to 10 wt %, more preferably from 0.01 to 5 wt % and, in particular, from 0.1 to 3 wt %.

In a preferred embodiment, the content of the filler (B) in relation to the overall weight of the conductive paste, is from 0.03 wt % to 30 wt %, more preferably from 0.03 wt % to 25 wt % and, in particular, from 0.03 wt % to 20 wt %. More preferably, the filler (B) is present in the conductive paste in a uniformly distributed state. The uniform distribution of the filler is determined by means of optical evaluation (electron microscope). If the content of agglomerates in an area of 1 $mm^2$ is below 20% of the filler content, a uniform distribution is present.

An elastic binder (A) according to the invention, is a binder capable of changing its shape when a force is applied and of essentially returning to its original shape when the applied force is removed. Preferably, the binder (A) has an elongation, measured in accordance with ISO 527 (2018, Jun. 29), of at least 100%, for example 100 to 700%, more preferably at least 200%, for example 200 to 700% and, in particular, of at least 300, for example 300 to 700%.

Further preferably, the content of the binder (A), in relation to the overall weight of the conductive paste, is from 50 wt % to 99 wt %, more preferably from 60 wt % to 80 wt % and, in particular, from 65 wt % to 80 wt %.

In a further preferred embodiment, the elastic binder (A) comprises thermoplastic elastomers, preferably selected from the group comprising silicones, urethanes, epoxy resins, amides, esters or mixtures thereof.

In a further preferred embodiment, the elastic binder (A) is not conductive. In this embodiment, the elastic binder (A) preferably comprises binders selected from the group of polyurethanes, silicones, fluorosilicones, polycarbonates, ethylvinyl acetates (EVA), acrylonitrile butadiene styrene (ABS), acrylates, polyvinylchlorides (PVC), polyphenylethers, polystyrene, polyamides, nylon, polyolefins, polybutylene terephthalates (PBT), polyethylene terephthalates (PET), fluoropolymeres, rubber, in particular, NR (natural rubber), BR (butadiene rubber), IR (isoprene rubber), SBR (styrene butadiene rubber), CR (chloroprene rubber), BIIR (isobutene isoprene rubber), CM (chlorinated rubber), EP(D)M (ethylene propylene diene rubber), EU, NBR (nitril butadiene rubber), IIR (butyl rubber), CIIR (chlorinated butyl rubber), CSM (chlorosulfonated ethylene rubber), AU (polyurethane rubber), ECO (epichlorohydrin rubber), HNBR (hydrogenated nitrile butadiene rubber), ACM (acrylate rubber), FKM (fluorine rubber), VMQ (silicone rubber), EAM=AEM (ethylene acrylate rubber), FFKM perfluorinated rubber TFE+PFVE copolymer tetrafluoroethylene and perfluoroalkyl vinyl ether, FVMQ (poly-trifluoro propyl vinyl methyl siloxanes), EVA (ethylene-vinyl acetate rubber), polyester, acetals, polymethylacrylates, their copolymers and blends. Herein, the content of the afore-mentioned binders in binder (A) is preferably more than 50 wt %, for example from 50 wt % to 100 wt %.

In a preferred embodiment of the invention, the conductive paste has a stretchability of at least 30%, for example from 30% to 400%, more preferably from at least 40%, for example 40% to 300% and, in particular, from at least 60%, for example from 80% to 150%, measured in accordance with the EN ISO 527-1 (February 2012) standard.

The conductive paste can be applied to substrates, in particular elastomeric substrates. Preferred substrates are rubbers, since they have elastic properties themselves, or are stretchable. Preferred types of rubber are: NR (natural rubber), BR (butadiene rubber), IR (isoprene rubber), SBR (styrene-butadiene rubber), CR (chloroprene rubber), BIIR (isobutene isoprene rubber), CM (chlorinated rubber), EP(D)M (ethylene propylene diene rubber), EU, NBR (nitrile butadiene rubber), IIR (butyl rubber), CIIR (chlorinated butyl rubber), CSM (chlorosulfonated ethylene rubber), AU (polyurethane rubber), ECO (epichlorohydrin rubber), HNBR (hydrogenated nitrile butadiene rubber), ACM (acrylate rubber), FKM (fluorine rubber), VMQ (silicone rubber), EAM=AEM (ethylene acrylate rubber), FFKM perfluorinated rubber TFE+PFVE copolymer tetrafluoroethylene and perfluoroalkyl vinyl ether and/or FVMQ (poly-trifluoro propyl vinyl methyl siloxanes).

A preferred embodiment comprises the use of the conductive paste for application on elastomeric substrates.

The conductive paste according to the invention can, for example, be produced by a method comprising the following method steps:

A) producing or providing a dispersion comprising an elastic binder (A);

B) introducing a conductive filler (B) into the dispersion, wherein the conductive filler (B) comprises the following components: at least one spherical conductive filler (B1), at least one plate-like conductive filler (B2) and at least one rod-like conductive filler (B3).

For the conductive paste, the elastic binder (A), the conductive filler (B), the spherical conductive filler (B1), the at least one plate-like conductive filler (B2) and/or the rod-like conductive filler (B3) and, in particular for their preferred embodiments, the above applies mutatis mutandis.

The production of the dispersion in step A) is preferably carried out by dispersing the elastic binder (A) in water or in a solvent, for example alkanes, alcohols, acids, ethers, esters, aromatics, heteroaromatics, halogenated solvents, water, and their mixtures. Dispersing is preferably carried out in a mixing machine, for example a Speedmixer.

Introducing the conductive filler (B) in step B) into the dispersion is preferably carried out by a mixing operation, for example by static and dynamic mixing systems. These can be supported by ultrasonic mixing operations.

A further subject matter of the present invention is the use of the paste for the production of conductive structures, such as sensors or actuators. For the latter, conductive and stretchable surfaces are particularly interesting since conductivity and stretchability are equally needed for these applications.

The invention will be more closely described in the following with reference to several examples.

EXAMPLE 1

Production of a Conductive Paste According to the Invention (Recipe Paste B)

An Impranil DLU dispersion (60 wt % solids content polyurethane in water, binder A) is weighed into a Speedmixer container (11 g) suitable for the amount processed.

Subsequently the components of the filler (B), beginning with the dispersed filling substances, (Rhenofit® CNT (filler B3), 5.5 g)) and C-Sperse® or Birla Conductex SC Ultra® (filler B1, 1.49 g) and then the solid filler (eConduct Cu or eConduct Glass (filler B2), 1.75 g) are added and roughly mixed in by means of a wooden spatula. It is mixed in the Speedmixer at 2300 rpm for one minute, stirred with a wooden spatula and again mixed in the Speedmixer (1 minute at 2300 rpm). After the application on an elastomer (TPU film) the paste is dried at 60° C. for 2 h.

Paste B is obtained. The electric resistivity is measured on the cured paste (B) by means of a four-point measuring method. The result is a value of 860 [Ω], which is very low for the low content of filler.

To produce the above-mentioned Birla Conductex SC Ultra carbon dispersions, 89 wt % water is filled in a Speedmixer container, 1% sodium dodecylbenzosulfonate tech. is added and pre-mixed in the Speedmixer at 2300 rpm for 15 seconds.

As a result, the paste B according to the invention is obtained. A four-point measuring method is used to measure the electrical resistivity on the cured paste (B). A value of 860 [Ω] is obtained as a result.

Subsequently, the carbon powder to be dispersed is weighed into and is mixed in the Speedmixer again in one go. Hereafter, the dispersion is stirred with a spatula prior to each application and stirred in the Speedmixer (1 min. at 2300 rpm).

EXAMPLE 2

Production of Several Conductive Pastes (A, C, D, E) According to the Invention and of Comparative Pastes (F, G, H)

In analogy to the method described in example 1, the pastes (A, C, D, E) according to the invention and the pastes (F, G, H) not according to the invention were produced. The amount percentages are illustrated in the following table.

TABLE 1

| Name of sample | Rhenofit® CNT-3 (1 wt % in water) | eConduct Cu(Ag) | eConduct Glass (Ag) | Birla® Conductex SC Ultra | C-Sperse® |
|---|---|---|---|---|---|
| paste A according to the invention | 0.5 wt % | | 8 wt % | 2.41 wt % | |
| paste C according to the invention | 0.5 wt % | 8 wt % | 8 wt % | 2.41 wt % | |
| paste D according to the invention | 0.5 wt % | | 16 wt % | | 2.41 wt % |
| paste E3 according to the invention | 0.5 wt % | | 16 wt % | | 5 wt % |
| paste F not according to the invention | 0.5 wt % | — | — | — | — |
| paste G not according to the invention | 0.5 wt % | — | — | 2.41 wt % | |

TABLE 1-continued

| Name of sample | Rhenofit ® CNT-3 (1 wt % in water) | eConduct Cu(Ag) | eConduct Glass (Ag) | Birla ® Conductex SC Ultra | C-Sperse ® |
|---|---|---|---|---|---|
| invention paste H not according to the invention | | | | 16 wt % | 2.41 wt % |

The fillers indicated in the above table are each dispersed in Inpranil DLU. The recipes are indicated in wt % in relation 100 g Impranil DLU dispersion.

EXAMPLE 3

Determination of the Electrical Resistivity of the Pastes According to the Invention and the Comparative Pastes The electrical resistivity of the pastes according to the invention and of the comparative pastes was determined by means of the four-point measuring method. The results are shown in the following table.

TABLE 2

| Name of sample | resistivity [Ω]4 |
|---|---|
| paste A according to the invention | 2,300 |
| paste C according to the invention | 780 |
| paste D according to the invention | 740 |
| paste E3 according to the invention | 570 |
| paste F not according to the invention | 40,000 |
| paste G not according to the invention | 7,500 |
| paste H not according to the invention | 13,000 |

As can be derived from the table above, the pastes according to the invention have substantially lower resistivities than the comparative pastes not according to the invention. This is particularly remarkable, because the pastes according to the invention, due to their low filler content, have comparable stretchability to the pastes not according to the invention. Moreover, the low resistivities are remarkable, because, usually, substantially more filler is needed to achieve this.

If a standard is referred to in the present text, the standard valid on the day of application is applicable, if not indicated differently.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrically conductive paste, comprising:
   an elastic binder; and
   a conductive filler,
   wherein the conductive filler comprises: at least one spherical conductive filler, at least one plate-like conductive filler, and at least one rod-like conductive filler, and
   wherein a content of the filler in relation to an overall weight of the conductive paste, is from 0.03 wt % to 25 wt %.

2. The electrically conductive paste of claim 1, wherein the spherical filler has a mean particle diameter, measured in accordance with ISO 21501-2:2019-11 of at most 200 μm.

3. The electrically conductive paste of claim 2, wherein the mean particle diameter is 0.02 μm to 200 μm.

4. The electrically conductive paste of claim 3, wherein the mean particle diameter is at most 100 μm.

5. The electrically conductive paste of claim 4, wherein the mean particle diameter is from 0.02 μm to 100 μm.

6. The electrically conductive paste of claim 5, wherein the mean particle diameter is from 0.02 μm to 50 μm.

7. The electrically conductive paste of claim 6, wherein the mean particle diameter is from 0.02 μm to 10 μm.

8. The electrically conductive paste of claim 1, wherein a content of the spherical filler, in relation to an overall weight of the conductive paste, is from 0.1 to 25 wt %.

9. The electrically conductive paste of claim 1, wherein the plate-like filler has an aspect ratio of at least 1/10 and smaller than $1/10^6$.

10. The electrically conductive paste of claim 1, wherein the plate-like filler has a mean particle size, measured in accordance with ISO 21501-2:2019-11 of at most 150 μm.

11. The electrically conductive paste of claim 1, wherein a content of the plate-like filler in relation to an overall weight of the conductive paste, is from 0.5 to 25 wt %.

12. The electrically conductive paste of claim 1, wherein the rod-like filler has a mean aspect ratio of at least 0.1.

13. The electrically conductive paste of claim 1, wherein a content of the rod-like filler in relation to an overall weight of the conductive paste, is from 0.01 to 10 wt %.

14. The electrically conductive paste of claim 1, wherein a content of the filler in relation to an overall weight of the conductive paste, is from 0.03 wt % to 20 wt %.

15. The electrically conductive paste of claim 1, wherein a content of the binder in relation to an overall weight of the conductive paste is from 50 wt % to 99 wt %.

16. The electrically conductive paste of claim 1, wherein the elastic binder comprises thermoplastic elastomers.

17. The electrically conductive paste of claim 1, wherein the electrically conductive paste has a stretchability of at least 30% measured in accordance with EN ISO 527-1 (February 2012).

18. The electrically conductive paste of claim 1, wherein the electrically conductive paste is applied to an elastomeric substrate.

19. A method, comprising:
applying the electrically conductive paste of claim 1 to elastomeric substrates.

20. A method of producing an electrically conductive paste, comprising:
producing or providing a dispersion comprising an elastic binder; and
introducing a conductive filler into the dispersion, the conductive filler comprising: at least one spherical conductive filler, at least one plate-like conductive filler, and at least one rod-like conductive filler,
wherein a content of the filler in relation to an overall weight of the conductive paste, is from 0.03 wt % to 25 wt %.

* * * * *